(12) United States Patent
Yokomizo

(10) Patent No.: US 10,148,860 B2
(45) Date of Patent: Dec. 4, 2018

(54) IMAGING APPARATUS, EXTERNAL APPARATUS, IMAGING SYSTEM, CONTROL METHOD FOR IMAGING APPARATUS, CONTROL METHOD FOR EXTERNAL APPARATUS, CONTROL METHOD FOR IMAGING SYSTEM, AND PROGRAM

(71) Applicant: CANON KABUSHIKI KAISHA, Tokyo (JP)

(72) Inventor: Tsuyoshi Yokomizo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/789,837

(22) Filed: Oct. 20, 2017

(65) Prior Publication Data

US 2018/0041687 A1 Feb. 8, 2018

Related U.S. Application Data

(63) Continuation of application No. 15/035,462, filed as application No. PCT/JP2014/005600 on Nov. 7, 2014, now Pat. No. 9,826,137.

(30) Foreign Application Priority Data

Nov. 12, 2013 (JP) ................................. 2013-234250

(51) Int. Cl.
  *H04N 5/225* (2006.01)
  *H04N 5/232* (2006.01)
  (Continued)

(52) U.S. Cl.
  CPC ..... *H04N 5/23206* (2013.01); *G06F 3/04842* (2013.01); *H04N 5/2352* (2013.01);
  (Continued)

(58) Field of Classification Search
  None
  See application file for complete search history.

(56) References Cited

U.S. PATENT DOCUMENTS

2006/0055817 A1* 3/2006 Ito .................... H04N 5/2352
   348/362

FOREIGN PATENT DOCUMENTS

CN   101399921 A   4/2009
CN   101729789 A   6/2010
(Continued)

OTHER PUBLICATIONS

Tang, et al., "The Application of Dynamic Range Technology on HD Digital Camera", Dec. 31, 2010, China Academic Journal Electronic Publishing House, http://www.cnki.net, English abstract included.

*Primary Examiner* — Stephen P Coleman
(74) *Attorney, Agent, or Firm* — Canon USA, Inc. I.P. Division

(57) ABSTRACT

An imaging apparatus which communicates with an external apparatus via a network, includes an imaging unit; a first image processing unit configured to change, by image processing, a brightness of a captured image output from the imaging unit; a second image processing unit configured to change, by image processing that is different from the image processing by the first image processing unit, a brightness of a captured image output from the imaging unit; a receiving unit configured to receive, from the external apparatus via the network, a single command in which first image processing information for controlling an operation of the first image processing unit and second image processing information for controlling an operation of the second image processing unit may be described; and a control unit configured to control the first image processing unit and the
(Continued)

second image processing unit in accordance with the command received by the receiving unit.

19 Claims, 13 Drawing Sheets

(51) Int. Cl.
*H04N 5/235* (2006.01)
*H04N 5/353* (2011.01)
*H04N 5/355* (2011.01)
*G06F 3/0484* (2013.01)

(52) U.S. Cl.
CPC ......... *H04N 5/2353* (2013.01); *H04N 5/2355* (2013.01); *H04N 5/23245* (2013.01); *H04N 5/23293* (2013.01); *H04N 5/353* (2013.01); *H04N 5/35581* (2013.01)

(56) References Cited

FOREIGN PATENT DOCUMENTS

| | | |
|---|---|---|
| JP | 2006-074227 A | 3/2006 |
| JP | 2009-088930 A | 4/2009 |
| JP | 2010-103634 A | 5/2010 |
| JP | 2010-272094 A | 12/2010 |
| KR | 10-1771406 B1 | 8/2017 |

\* cited by examiner

FIG. 6A

```
<xs:complexType name="ImagingSettings20">
 <xs:sequence>
  <xs:element name="BacklightCompensation" type="tt:BacklightCompensation20" minOccurs="0"/>
  <xs:element name="Brightness" type="xs:float" minOccurs="0"/>
  <xs:element name="ColorSaturation" type="xs:float" minOccurs="0"/>
  <xs:element name="Contrast" type="xs:float" minOccurs="0"/>
  <xs:element name="Exposure" type="tt:Exposure20" minOccurs="0"/>
  <xs:element name="Focus" type="tt:FocusConfiguration20" minOccurs="0"/>
  <xs:element name="IrCutFilter" type="tt:IrCutFilterMode" minOccurs="0"/>
  <xs:element name="Sharpness" type="xs:float" minOccurs="0"/>
  <xs:element name="WideDynamicRange" type="tt:WideDynamicRange20" minOccurs="0"/>
  <xs:element name="WhiteBalance" type="tt:WhiteBalance20" minOccurs="0"/>
  <xs:element name="Extension" type="tt:ImagingSettingsExtension20" minOccurs="0"/>
 </xs:sequence>
 <xs:anyAttribute processContents="lax"/>
</xs:complexType>
```

FIG. 6B

```
<xs:complexType name="ImagingSettingsExtension20">
  <xs:sequence>
    <xs:any namespace="##other" processContents="lax" minOccurs="0" maxOccurs="unbounded"/>
    <xs:element name="ImageStabilization" type="tt:ImageStabilization" minOccurs="0"/>
    <xs:element name="Extension" type="tt:ImagingSettingsExtension202" minOccurs="0"/>
  </xs:sequence>
</xs:complexType>
```

FIG. 6C

```
<xs:complexType name="ImagingSettingsExtension202">
  <xs:sequence>
    <xs:element name="IrCutFilterAutoAdjustment" type="tt:IrCutFilterAutoAdjustment" minOccurs="0" maxOccurs="unbounded"/>
    <xs:element name="Extension" type="tt:ImagingSettingsExtension203" minOccurs="0"/>
  </xs:sequence>
</xs:complexType>
```

FIG. 6D

```
<xs:complexType name="ImagingSettingsExtension203">
  <xs:sequence>
    <xs:element name="DarkCompensation" type="tt:DarkCompensation" minOccurs="0" maxOccurs="unbounded"/>
    <xs:element name="Extension" type="tt:ImagingSettingsExtension204" minOccurs="0"/>
  </xs:sequence>
</xs:complexType>
```

FIG. 6E

```
<xs:complexType name="ImagingSettingsExtension204">
    <xs:sequence>
        <xs:any namespace="##targetNamespace" processContents="lax" minOccurs="0" maxOccurs="unbounded"/>
    </xs:sequence>
</xs:complexType>
```

FIG. 7A

```
<s:Body
..
    <SetImagingSettings xmlns="http://www.onvif.org/ver20/imaging/wsdl">
        <ImagingSettings xmlns="http://www.onvif.org/ver20/imaging/wsdl">>
            <BacklightCompensation xmlns="http://www.onvif.org/ver10/schema">
                (BacklightCompensation SET VALUE)
            <BacklightCompensation/>
            <WideDynamicRange xmlns="http://www.onvif.org/ver10/schema">
                (WideDynamicRange SET VALUE)
            <WideDynamicRange/>
            <DarkCompensation xmlns="http://www.onvif.org/ver10/schema">
                (DarkCompensation SET VALUE)
            <DarkCompensation/>
        </ImagingSettings>
    </SetImagingSettings>
..
</s:Body>
```

FIG. 7B

```
<BacklightCompensation xmlns="http://www.onvif.org/ver10/schema">
            <Mode>
            ON
            </Mode>
            <Level>
            1.8
            </Level>
<BacklightCompensation/>
```

FIG. 7C

```
<WideDynamicRange xmlns="http://www.onvif.org/ver10/schema">
            <Mode>
            ON
            </Mode>
            <Level>
            1.5
            </Level>
<WideDynamicRange/>
```

FIG. 7D

```
<DarkCompensation xmlns="http://www.onvif.org/ver10/schema">
            <Mode>
            Auto
            </Mode>
<DarkCompensation/>
```

IMAGING APPARATUS, EXTERNAL APPARATUS, IMAGING SYSTEM, CONTROL METHOD FOR IMAGING APPARATUS, CONTROL METHOD FOR EXTERNAL APPARATUS, CONTROL METHOD FOR IMAGING SYSTEM, AND PROGRAM

CROSS-REFERENCE TO RELATED APPLICATIONS

This application is a continuation of U.S. patent application Ser. No. 15/035,462, filed on May 9, 2016, that is a national phase application of international patent application PCT/JP2014/005600 filed on Nov. 7, 2014, which patent(s) and patent applications are hereby incorporated by reference herein in their entireties. This application also claims the benefit of Japanese Patent Application No. 2013-234250, filed Nov. 12, 2013, which applications are hereby incorporated by reference herein in their entireties.

TECHNICAL FIELD

The present invention relates to an imaging apparatus, an external apparatus, an imaging system, a control method for the imaging apparatus, a control method for the external apparatus, a control method for the imaging system, and a program. More particularly, the present invention is suitably applicable to a process for brightening a captured image.

BACKGROUND ART

There has been a problem that, when an image of an outdoor scene is captured from an indoor location, a subject is darkened against a bright background and is difficult to see. As a solution to such a problem, plural techniques to brighten a captured image output from an imaging unit have been known.

There has been, for example, a backlight correction process in which a captured image is brightened by performing gain correction and the like of the captured image. Further, a wide dynamic range process has been known in which multiple captured images are synthesized and the synthesized image having a wide dynamic range is obtained. PTL 1 discloses a technique of synthesizing multiple captured images with different exposure times to generate a captured image with a dynamic range wider than normal.

As an example of the techniques mentioned above, in silver salt photography, there has been a dodging process performed in a darkroom for obtaining a photograph with a wide dynamic range. There has been a technique (digital dodging process) which is realized by applying the dodging process to a digital image process, in which a captured image of a subject having a large difference between brightness and darkness, particularly a subject under backlight, is corrected. Further, in the digital dodging process, in order to adjust the intensity of the process, the gain and the like of a captured image are changed.

As another example of the techniques mentioned above, a process has been known which outputs a captured image with a subject that is easily identifiable, by employing a process of exposure correction of a single captured image.

Further, in recent years, there has been a case where a single imaging apparatus is provided with those multiple processes. In addition, with a rapidly spreading network technology, there has been an increasing user's need for controlling such an imaging apparatus from an external apparatus through a network.

However, in the imaging apparatus described above, a captured image becomes too bright in some cases when those multiple processes are performed simultaneously. For example, when a backlight correction process, a wide dynamic range process, and a digital dodging process are performed on a captured image at the same time, the captured image may become too bright.

Further, whether or not a captured image becomes too bright due to the simultaneous execution of those multiple processes on the captured image, depends on a subject. When it is assumed that the above-described imaging apparatus captures an image of an outdoor scene or that a subject moves during imaging, the subject image changes constantly.

Furthermore, with the imaging apparatus described above, whether or not the captured image becomes too bright also depends on the degree at which each of the processes brightens the captured image. However, the degree at which each of the processes brightens the captured image varies according to the model of the imaging apparatus or the manufacturer of the imaging apparatus.

Therefore, in the case where the imaging apparatus described above is installed at a place remote from a user, it is difficult for the user operating an external apparatus to control individual performances of processes in an attempt to prevent the captured image from becoming too bright, while taking into account changes of a subject of the imaging apparatus and the model or manufacturer of the imaging apparatus.

CITATION LIST

Patent Literature

[PTL 1]
Japanese Patent Laid-Open No. 2008-236142

SUMMARY OF INVENTION

Solution to Problem

The present invention has been made in consideration of the above issues, and reduces the need for controlling performances of a first process and a second process for brightening a captured image in accordance with effects of the first process and the second process.

The present invention provides an imaging apparatus which communicates with an external apparatus via a network, including an imaging unit; a first image processing unit configured to change, by image processing, a brightness of a captured image output from the imaging unit; a second image processing unit configured to change, by image processing that is different from the image processing by the first image processing unit, a brightness of a captured image output from the imaging unit; a receiving unit configured to receive, from the external apparatus via the network, a single command in which first image processing information for controlling an operation of the first image processing unit and second image processing information for controlling an operation of the second image processing unit may be described; and a control unit configured to control the first image processing unit and the second image processing unit in accordance with the command received by the receiving unit. The first image processing information includes at least anyone of information indicating that the first image processing unit is caused to be operated and information indicating that the first image processing unit is caused to be stopped. The second image processing information includes at least anyone of information indicating that the second image processing unit is caused to be operated, information indicating that the second image processing unit is caused to be stopped, and information indicating that the operation of the second image processing unit is caused to be automatically controlled by the imaging apparatus.

Further features of the present invention will become apparent from the following description of exemplary embodiments with reference to the attached drawings.

BRIEF DESCRIPTION OF DRAWINGS

FIG. 6A is a diagram illustrating an example of a definition of an ImagingSettings type according to the first embodiment of the present invention.

FIG. 6B is a diagram illustrating an example of the definition of the ImagingSettings type according to the first embodiment of the present invention.

FIG. 6C is a diagram illustrating an example of the definition of the ImagingSettings type according to the first embodiment of the present invention.

FIG. 6D is a diagram illustrating an example of the definition of the ImagingSettings type according to the first embodiment of the present invention.

FIG. 6E is a diagram illustrating an example of the definition of the ImagingSettings type according to the first embodiment of the present invention.

FIG. 7A is a diagram illustrating a command configuration example of a SetImagingSettings transaction according to the first embodiment of the present invention.

FIG. 7B is a diagram illustrating a command configuration example of the SetImagingSettings transaction according to the first embodiment of the present invention.

FIG. 7C is a diagram illustrating a command configuration example of the SetImagingSettings transaction according to the first embodiment of the present invention.

FIG. 7D is a diagram illustrating a command configuration example of the SetImagingSettings transaction according to the first embodiment of the present invention.

DESCRIPTION OF EMBODIMENTS

Embodiments of the present invention will be described hereinafter with reference to figures.

Configurations in the description below of the embodiments are only examples, and the present invention is not limited to the illustrated configurations. Commands in the description of the embodiments below are defined, for example, based on the standard of Open Network Video Interface Forum (hereinafter, may be referred to as ONVIF).

First Embodiment

Figure 1:
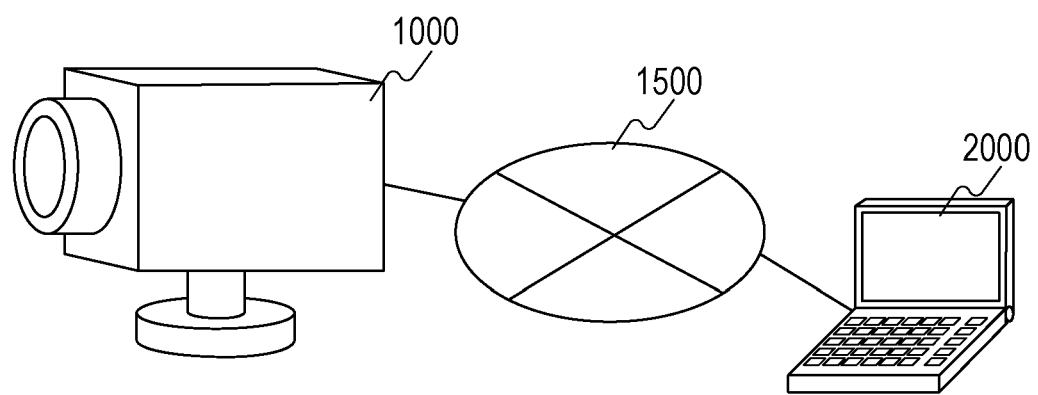
FIG. 1 is a diagram illustrating an example of a system configuration of a monitoring system according to a first embodiment of the present invention.

Hereinafter, a network configuration according to a first embodiment will be described with reference to FIG. 1. More particularly, FIG. 1 is a diagram illustrating an example of a system configuration of a monitoring system according to the first embodiment.

In the monitoring system according to the first embodiment, a monitoring camera 1000 which captures a moving image and a client apparatus 2000 are connected in a mutually communicable manner via an IP network 1500 (through a network). This enables the monitoring camera 1000 to distribute captured images to the client apparatus 2000 via the IP network 1500.

The client apparatus 2000 according to the first embodiment is an example of an external apparatus such as a PC or the like. A monitoring system according to the first embodiment corresponds to an imaging system.

Further, the IP network 1500 includes, for example, multiple routers, switches, cables, and the like, which comply with a communication standard such as Ethernet® or the like. However, in the first embodiment, any communication standard, size, or configuration may be used as long as communication between the monitoring camera 1000 and the client apparatus 2000 is possible.

For example, the IP network 1500 may be the Internet, a wired local area network (LAN), a wireless LAN, a wide area network (WAN), or the like. The monitoring camera 1000 according to the first embodiment may be, for example, compatible with Power Over Ethernet® (PoE) or supplied with electricity through a LAN cable.

The client apparatus 2000 sends various commands to the monitoring camera 1000. Those commands include, for example, a command for changing an imaging direction or an image angle of the monitoring camera 1000, a command for changing an imaging parameter, a command for starting image streaming, and the like.

The monitoring camera 1000 sends to the client apparatus 2000a response to those commands and image streaming. Further, the monitoring camera 1000 changes an image angle in accordance with a command received from the client apparatus 2000 for changing the image angle.

Figure 2:
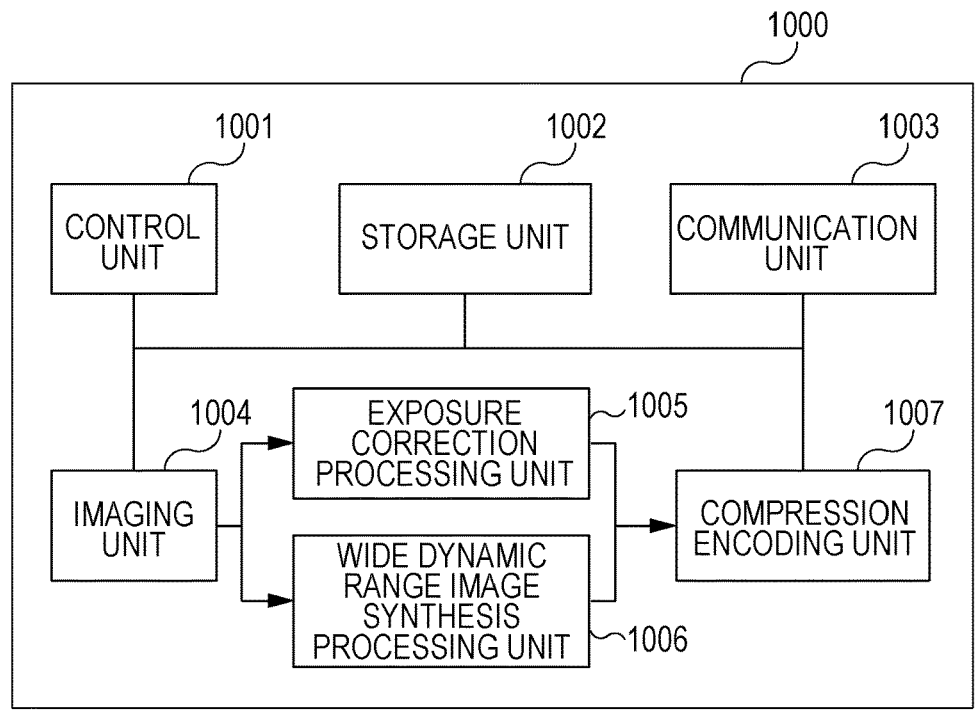
FIG. 2 is a diagram illustrating an example of a hardware configuration of a monitoring camera according to the first embodiment of the present invention.

FIG. 2 is a diagram illustrating an example of a hardware configuration of the monitoring camera 1000 according to the first embodiment.

A control unit 1001 in FIG. 2 comprehensively controls individual components of the monitoring camera 1000. The control unit 1001 includes a central processing unit (CPU). The control unit 1001 executes a program stored in a storage unit 1002. Alternatively, the control unit 1001 may be configured to perform control by using hardware.

The storage unit 1002 is used as storage areas of various data, such as a storage area of a program executed mainly by the control unit 1001, a work area during execution of a program, and a storage area of a captured image generated by an imaging unit 1004 described later. A communication unit 1003 receives individual control commands from the client apparatus 2000. Further, the communication unit 1003 sends individual control commands to the client apparatus 2000.

The imaging unit 1004 includes an imaging optical system and an imaging element such as a charge-coupled device (CCD) or a complementary metal-oxide semiconductor (CMOS), which are not illustrated, and the like. The imaging unit 1004 generates an analogue signal by capturing an image of a subject whose image is formed by the imaging optical system. The imaging unit 1004 converts the generated analogue signal into digital data.

The imaging unit 1004 outputs the converted digital data as a captured image to the storage unit 1002, an exposure correction processing unit 1005, and a wide dynamic range image synthesis processing unit 1006.

The exposure correction processing unit 1005 analyzes a captured image output from the imaging unit 1004, and performs an exposure correction process on the captured image, based on the details of image processing setting stored in the storage unit 1002. Further, the exposure correction processing unit 1005 outputs the captured image, on which the exposure correction process has been performed, to the storage unit 1002.

The exposure correction process according to the first embodiment includes a backlight correction process, a dark part correction process, and the like. The backlight correction process is a process for performing gain correction for a captured image and the like to brighten the entire captured image, which includes a dark part under the backlight condition.

The dark part correction process is an image process for determining a dark part included in a captured image and brightening the determined dark part in a focused manner by gain correction and the like. The dark part correction process may also cause a bright part to be brightened which is included in the captured image. Because of this, when the dark part correction process is performed in conjunction with the backlight correction process and a wide dynamic range image synthesis process, which will be described later, a captured image output from the imaging unit 1004 may become too bright.

The exposure correction process according to the first embodiment is provided with an exposure setting function to set exposure conditions of the imaging unit 1004. The exposure conditions include an aperture value of the imaging optical system included in the imaging unit 1004, an exposure time (storage time) of the imaging element included in the imaging unit 1004, and the like.

The exposure correction processing unit 1005 according to the first embodiment corresponds to an exposure setting unit which sets exposure conditions of the imaging unit 1004 and obtains a captured image generated by capturing an image of a subject with the imaging unit 1004 under the set exposure conditions.

Regarding the wide dynamic range image synthesis processing unit 1006, hereinafter, a wide dynamic range may be abbreviated as a WDR and a wide dynamic range image synthesis process may be abbreviated as a WDR process.

The WDR image synthesis processing unit 1006 performs a WDR process, which expands a dynamic range of a captured image output from the imaging unit 1004, based on the details of image processing setting stored in the storage unit 1002.

In the WDR process, parts having optimal brightnesses are determined from among multiple images with different exposure conditions output from the imaging unit 1004, and the determined parts of the multiple images are synthesized to generate a synthesized captured image having a wide dynamic range. The WDR image synthesis processing unit 1006 outputs the generated synthesized captured image to the storage unit 1002.

The exposure conditions in the first embodiment include an exposure time (storage time) and the like of the imaging element included in the imaging unit 1004. Further, the WDR image synthesis processing unit 1006 according to the first embodiment corresponds to a first image processing unit which synthesizes plural captured images generated by capturing a subject with the imaging unit 1004 under different exposure conditions to generate a synthesized captured image.

A compression encoding unit 1007 performs a compression encoding process on a captured image output from the imaging unit 1004, the exposure correction processing unit 1005, and the WDR image synthesis processing unit 1006, based on a method of Joint Photographic Experts Group (JPEG), H.264, H.265, or the like, in accordance with the details of compression encoding setting. The compression encoding setting is stored in the storage unit 1002. The compression encoding unit 1007 outputs to the storage unit 1002 the captured image on which the compression encoding process has been performed.

When the monitoring camera 1000 according to the first embodiment is requested by the client apparatus 2000 for streaming distribution, the monitoring camera 1000 performs streaming distribution of captured images output from the compression encoding unit 1007 to outside via the communication unit 1003, based on the details of the request.

Figure 3:
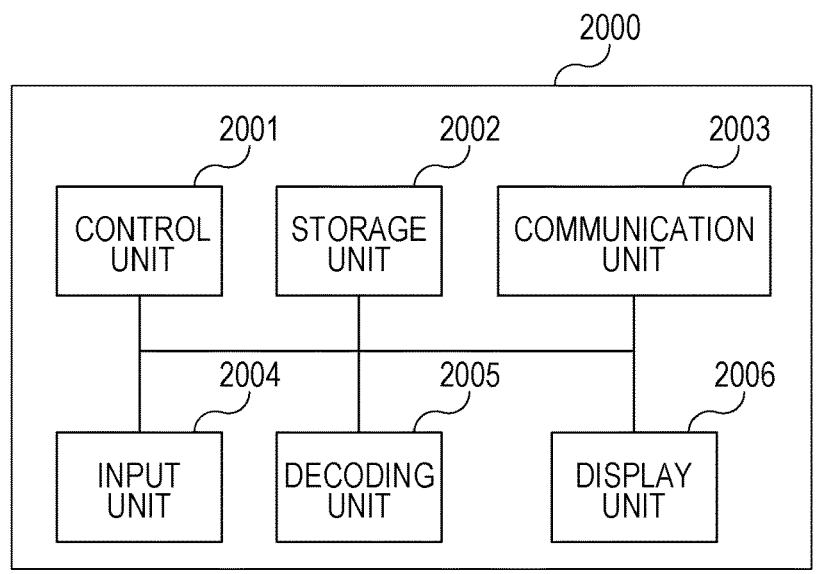
FIG. 3 is a diagram illustrating an example of a hardware configuration of a client apparatus according to the first embodiment of the present invention.

FIG. 3 is a diagram illustrating an example of a hardware configuration of the client apparatus 2000 according to the first embodiment. The client apparatus 2000 according to the first embodiment is configured as a computer apparatus connected to the IP network 1500.

A control unit 2001 in FIG. 3 controls the entire client apparatus 2000. The control unit 2001 includes, for example, a CPU, and executes a program stored in a storage unit 2002, which will be described later. Alternatively, the control unit 2001 may be configured to perform control by using hardware. The storage unit 2002 is used as a storage area for a program executed by the control unit 2001, a work area during execution of a program, and a data storage area.

A communication unit 2003 receives an instruction from the control unit 2001 and sends a command and the like to the monitoring camera 1000. The communication unit 2003 also receives from the monitoring camera 1000 a response to the command, a captured image distributed through streaming, and the like.

An input unit 2004 includes, for example, a button, a cross key, a touch panel, a mouse, and the like. The input unit 2004 receives an input of an instruction from a user. For example, the input unit 2004 receives, as an instruction from a user, an input of an instruction for sending various commands to the monitoring camera 1000.

When the input unit 2004 receives from a user a command sending instruction to the monitoring camera 1000, the input unit 2004 notifies the control unit 2001 of the input of the command sending instruction. The control unit 2001 generates a command to the monitoring camera 1000 in accordance with the instruction input to the input unit 2004. Then, the control unit 2001 instructs the communication unit 2003 to send the generated command to the monitoring camera 1000.

Further, the input unit 2004 is able to receive an input of a response from a user to an inquiry message or the like to the user, which has been generated when the control unit 2001 executes a program stored in the storage unit 2002.

A decoding unit 2005 decodes and expands a captured image output from the communication unit 2003. The decoding unit 2005 outputs the decoded and expanded captured image to a display unit 2006. Then, the display unit 2006 displays an image corresponding to the captured image output from the decoding unit 2005.

The display unit 2006 is able to display an inquiry message or the like to the user, which has been generated when the control unit 2001 executes a program stored in the storage unit 2002.

The internal configurations of the monitoring camera 1000 and the client apparatus 2000 have been described above. The processing blocks illustrated in FIG. 2 and FIG. 3 are only for exemplifying an embodiment of the imaging apparatus and the external apparatus in the present invention, and the internal configurations of the monitoring camera 1000 and the client apparatus 2000 are not limited to those described above. Various modifications and changes are possible within the scope of the present invention, such as providing a voice input unit and a voice output unit.

Figure 4:
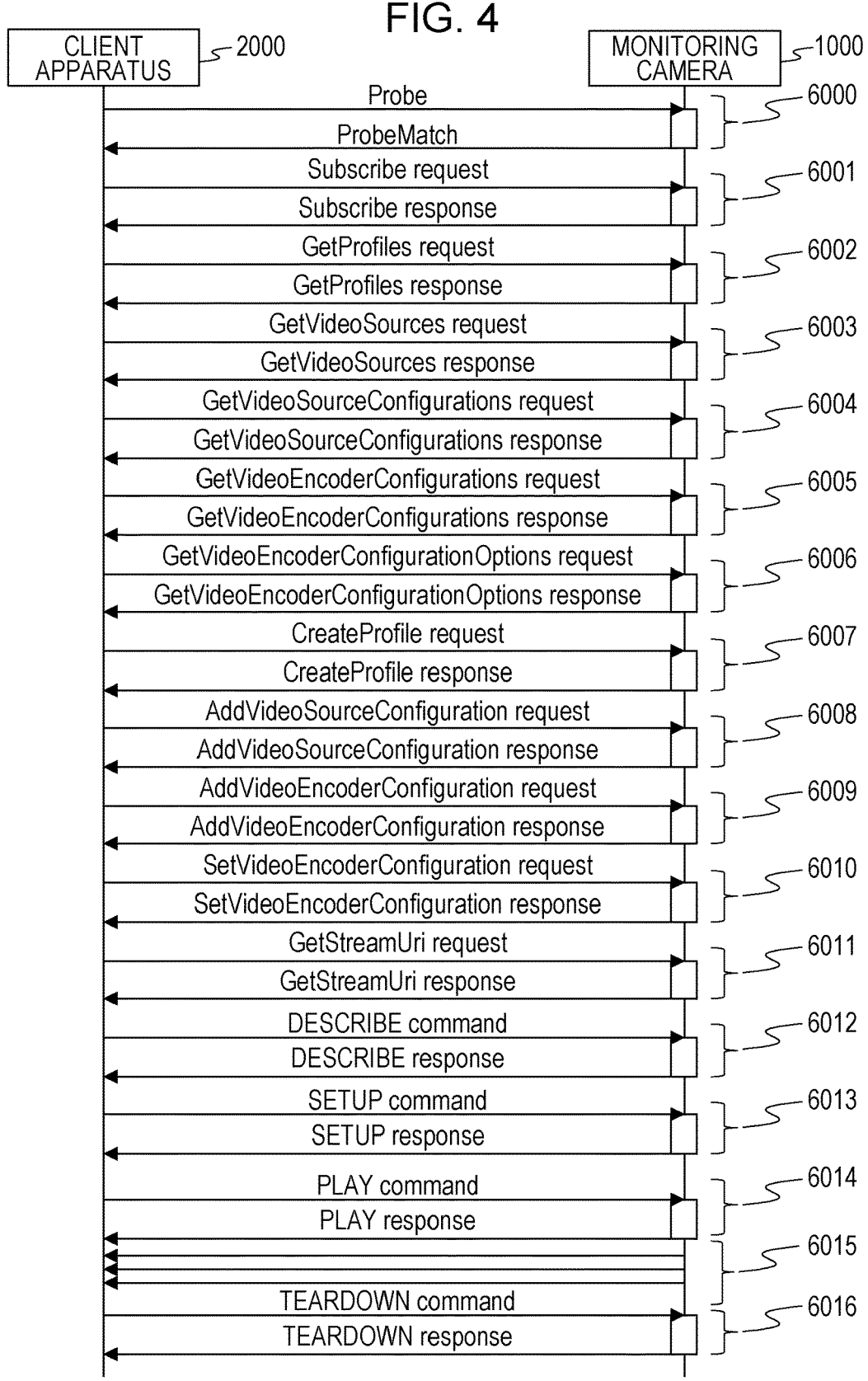
FIG. 4 is a sequence diagram for explaining a command sequence between the monitoring camera and the client apparatus according to the first embodiment of the present invention.

FIG. 4 is a sequence diagram for explaining a typical command sequence between the monitoring camera 1000 and the client apparatus 2000, from the start of setting of a parameter for a captured image to be distributed through streaming to streaming distribution of the captured image.

A transaction in the first embodiment represents a pair of a command sent from the client apparatus 2000 to the monitoring camera 1000 and a response to the command sent from the monitoring camera 1000 to the client apparatus 2000.

In FIG. 4, reference numeral 6000 represents a transaction of network apparatus connection. The client apparatus 2000 sends, to the IP network 1500 through unicast or multicast transmission, a Probe command for connection between network apparatuses. The monitoring camera 1000 connected to the network sends a ProbeMatch response, which indicates that a command is acceptable, to the client apparatus 2000.

Reference numeral 6001 represents a Subscribe transaction. Through this transaction, the client apparatus 2000 is able to issue an instruction to the monitoring camera 1000 to perform event distribution.

Reference numeral 6002 represents a GetProfiles transaction. This is a transaction for acquiring a MediaProfile, which corresponds to a distribution profile. A MediaProfile is a parameter set for storing various setting items of the monitoring camera 1000 in association with one another.

The various setting items include a ProfileToken, which is an ID of a MediaProfile, a VideoSourceConfiguration and a VideoEncorderConfiguration, which will be described later, a voice encoder, and the like. A MediaProfile holds a link to the various setting items.

The client apparatus 2000 sends a GetProfiles command to the monitoring camera 1000. The monitoring camera 1000 receives the GetProfiles command and then sends a MediaProfile list to the client apparatus 2000.

Thus, the client apparatus 2000 acquires, along with a distribution profile ID for identifying a MediaProfile, a list of MediaProfiles which are currently available for use by the monitoring camera 1000. The client apparatus 2000 identifies, based on the distribution profile ID, distributable profile setting existing in the monitoring camera 1000.

Reference numeral 6003 represents a transaction of a GetVideoSources command. With this command, the client apparatus 2000 acquires a list VideoSources held by the monitoring camera 1000.

A VideoSource is a parameter set representing the performance of the imaging unit 1004 provided in the monitoring camera 1000. A VideoSource includes a VideoSourceToken, which is an ID of a VideoSource, and Resolution, which represents the resolution of a captured image which can be output by the imaging unit 1004.

The client apparatus 2000 sends a GetVideoSources command to the monitoring camera 1000. The monitoring camera 1000 receives the GetVideoSources command and then sends a response to this command to the client apparatus 2000.

Reference numeral 6004 represents a GetVideoSourceConfigurations transaction. This transaction is a transaction for acquiring a list of VideoSourceConfigurations held by the monitoring camera 1000.

A VideoSourceConfiguration represents a parameter set for associating a VideoSource, provided in the monitoring camera 1000, with a MediaProfile. Further, a VideoSourceConfiguration includes Bounds, which specifies a part, of a captured image output from a VideoSource, to be cut out for an image to be distributed.

Hereinafter, a VideoSourceConfiguration may be referred to as a VSC.

The client apparatus 2000 sends a GetVideoSourceConfigurations command to the monitoring camera 1000. The monitoring camera 1000 receives the GetVideoSourceConfigurations command and then sends to the client apparatus 2000 a list which includes the ID of a VSC held by the monitoring camera 1000.

Reference numeral 6005 represents a GetVideoEncorderConfigurations transaction. Through this transaction, the client apparatus 2000 acquires a list of VideoEncorderConfigurations held by the monitoring camera 1000.

The client apparatus 2000 sends a GetVideoEncorderConfigurations command to the monitoring camera 1000. The monitoring camera 1000 receives the GetVideoEncorderConfigurations command and then sends a response to this command.

A VideoEncorderConfiguration is a parameter set for associating compression encoding setting concerning compression encoding of a captured image output from the imaging unit 1004, with a MediaProfile. Hereinafter, a VideoEncorderConfiguration may be referred to as a VEC. Compression encoding setting is stored in the storage unit 1002.

A VEC includes a VECToken, which is an ID of a VEC, Encoding for specifying a compression encoding method (JPEG, H.264, or the like), Resolution for specifying the resolution of an output image, and Quality for specifying compression encoding quality. The VEC further includes, concerning a captured image output from the monitoring camera 1000, FramerateLimit for specifying the maximum frame rate and BitrateLimit for specifying the maximum bit rate.

For example, the monitoring camera 1000 performs compression encoding, according to a parameter set in the VEC, on a captured image output from the imaging unit 1004 based on the details of the VideoSource and the VSC, and distributes the processed captured image to the client apparatus 2000 via the communication unit 1003.

Reference numeral 6006 represents a GetVideoEncorderConfigurationOptions transaction. Through this transaction, the client apparatus 2000 is able to acquire, concerning the VEC specified by the ID, options of individual parameters or the range of set values that can be accepted by the monitoring camera 1000.

The client apparatus 2000 sends a GetVideoEncorderConfigurationOptions command to the monitoring camera 1000. The monitoring camera 1000 receives the GetVideoEncorderConfigurationOptions command and then sends a response to this command. Through this transaction, the client apparatus 2000 acquires from the monitoring camera 1000 a list which includes the ID of compression encoding setting stored in the storage unit 1002.

Reference numeral 6007 represents a CreatePorfile transaction. This transaction is a transaction for requesting creation of a distribution profile. The client apparatus 2000 sends a CreateProfile command to the monitoring camera 1000. The monitoring camera 1000 receives the CreatePorfile command and then sends a response to this command.

Through this transaction, the client apparatus 2000 is able to create a new distribution profile in the monitoring camera 1000, and acquires the ID of the created distribution profile. Further, the monitoring camera 1000 stores the newly created distribution profile.

After the command processing for the transaction, the monitoring camera 1000 sends a MediaProfile change notification event to the client apparatus 2000, and thereby notifies the client apparatus 2000 of the occurrence of a change in the Media Profile.

Reference numeral 6008 represents an AddVideoSourceConfiguration transaction. This transaction is a transaction for requesting addition of a VSC. The client apparatus 2000 sends an AddVideoSourceConfiguration command to the monitoring camera 1000. The monitoring camera 1000 receives the AddVideoSourceConfiguration command and then sends a response to this command to the client apparatus 2000.

In this transaction, the client apparatus 2000 specifies the distribution profile ID acquired in the transaction 6007 and the ID of the VSC acquired in the transaction 6004. Thus, the client apparatus 2000 is able to associate a desired VSC corresponding to the ID of the specified VSC with the MediaProfile corresponding to the specified distribution profile ID.

Meanwhile, the monitoring camera 1000 stores the MediaProfile corresponding to the distribution profile ID specified by the client apparatus 2000 and the desired VSC corresponding to the ID of the VSC specified by the client apparatus 2000 in the storage unit 1002 in association with each other.

Reference numeral 6009 represents an AddVideoEncorderConfiguration transaction. This transaction is a transaction for requesting addition of a VEC. The client apparatus 2000 sends an AddVideoEncorderConfiguration command to the monitoring camera 1000. The monitoring camera 1000 sends a response to the AddVideoEncorderConfiguration command to the client apparatus 2000.

In this transaction, the client apparatus 2000 specifies the distribution profile ID acquired in the transaction 6007 and the ID of the VEC acquired in the transaction 6005. Thus, the client apparatus 2000 is able to associate the VEC corresponding to the ID of the specified VEC with the MediaProfile corresponding to the specified distribution profile ID.

Meanwhile, the monitoring camera 1000 stores the MediaProfile corresponding to the distribution profile ID specified by the client apparatus 2000 and the desired VEC corresponding to the ID of the VEC specified by the client apparatus 2000 in association with each other.

After the processing of the transactions 6008 and 6009, the monitoring camera 1000 sends a MediaProfile change notification event to the client apparatus 2000, and thereby notifies the client apparatus 2000 of the occurrence of a change in the MediaProfile.

Reference numeral 6010 represents a SetVideoEncorderConfiguration transaction. This transaction is a transaction for setting individual parameters of the VEC. The client apparatus 2000 sends the SetVideoEncorderConfiguration command to the monitoring camera 1000.

The monitoring camera 1000 receives the SetVideoEncorderConfiguration command and then sends a response to this command. Through this transaction, the client apparatus 2000 sets, based on the options acquired in the transaction 6006, the details of the VEC acquired in the transaction 6005. For example, a compression encoding method or cutting size is changed. The monitoring camera 1000 stores the details of the compression encoding setting and the like.

After the processing of the transaction, the monitoring camera 1000 sends a VEC change notification event to the client apparatus 2000, and thereby notifies the client apparatus 2000 of the occurrence of a change in the VEC.

Reference numeral 6011 represents a GetStreamUri transaction. This transaction is a transaction for requesting acquisition of a distribution address. In this transaction, the client apparatus 2000 specifies the distribution profile ID acquired in the transaction 6007 and acquires an address (uniform resource identifier (URI)) for acquiring a captured image to be distributed through streaming, and the like, based on the setting of the specified distribution profile.

The monitoring camera 1000 sends to the client apparatus 2000 the address for distribution through streaming of an image corresponding to the details of the VSC and the VEC associated with the distribution profile ID specified by the client apparatus 2000.

Reference numeral 6012 represents a DESCRIBE transaction. This transaction is a transaction for requesting acquisition of distribution information. The client apparatus 2000 sends a DESCRIBE command to the monitoring camera 1000. The monitoring camera 1000 receives the DESCRIBE command and then sends a response to this command to the client apparatus 2000.

In this transaction, the client apparatus 2000 executes the DESCRIBE command by using the URI acquired in the transaction 6011, and thereby requests and acquires information of the content to be distributed through streaming by the monitoring camera 1000.

Reference numeral 6013 represents a SETUP transaction. This transaction is a transaction for requesting distribution setting. The client apparatus 2000 sends a SETUP command to the monitoring camera 1000. The monitoring camera 1000 receives the SETUP command and then sends a response to this command to the client apparatus 2000.

In this transaction, the client apparatus 2000 causes the monitoring camera 1000 to prepare for streaming, based on detailed data on the distribution information acquired in the transaction 6012. By executing this command, the client apparatus 2000 and the monitoring camera 1000 share a stream transmission method including a session number.

Reference numeral 6014 represents a PLAY transaction. This transaction is a transaction for starting streaming distribution. The client apparatus 2000 sends a PLAY command to the monitoring camera 1000. The monitoring camera 1000 receives the PLAY command and then sends a response to this command to the client apparatus 2000.

When sending the PLAY command to the monitoring camera 1000, the client apparatus 2000 can request the monitoring camera 1000 to start streaming distribution by using the session number acquired in the transaction 6013.

Reference numeral 6015 represents a stream distributed from the monitoring camera 1000 to the client apparatus 2000. The stream requested to start in the transaction 6014 is distributed by the transmission method shared in the transaction 6013.

Reference numeral 6016 represents a TEARDOWN transaction. This transaction is a transaction for stopping streaming distribution. The client apparatus 2000 sends a TEARDOWN command to the monitoring camera 1000. The monitoring camera 1000 receives the TEARDOWN command and then sends a response to this command.

In this transaction, the client apparatus 2000 executes the TEARDOWN command by specifying the session number acquired in the transaction 6013, and thereby requests the monitoring camera 1000 to stop the streaming distribution.

Figure 5:
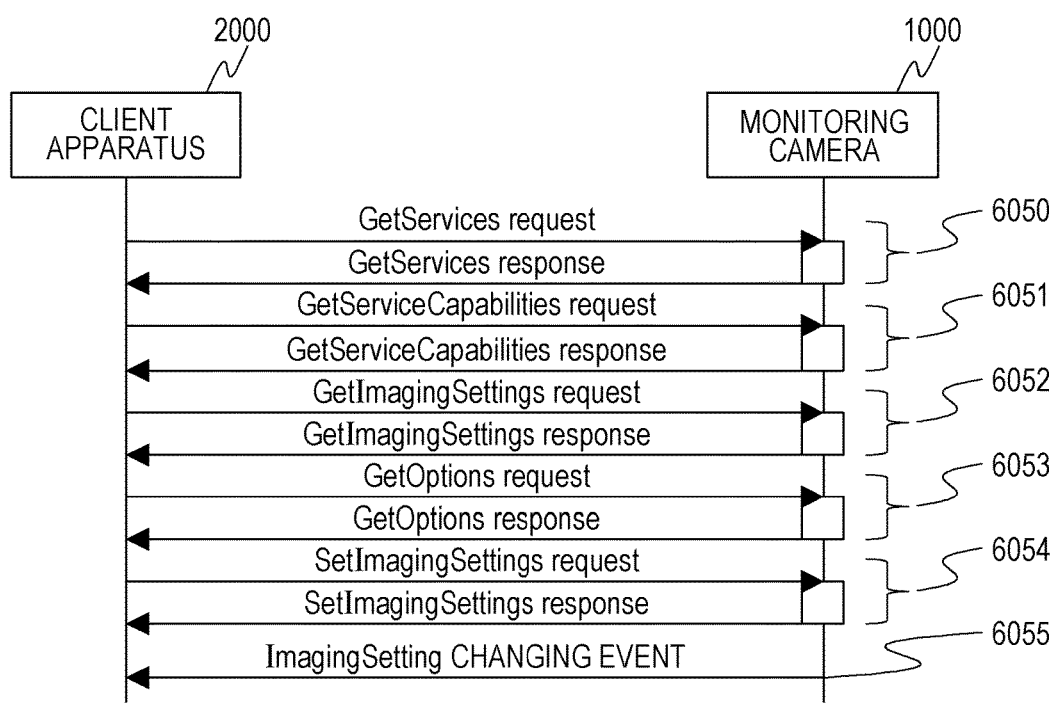
FIG. 5 is a sequence diagram for explaining a command sequence between the monitoring camera and the client apparatus according to the first embodiment of the present invention.

FIG. 5 is a sequence diagram for explaining a typical command sequence between the monitoring camera 1000 and the client apparatus 2000, for changing ImagingSetting, which corresponds to image processing setting.

Reference numeral 6050 in FIG. 5 represents a GetServices transaction. Through this transaction, the client apparatus 2000 is able to acquire types of Web services supported by the monitoring camera 1000 and the address URI for using each of the Web services.

The client apparatus 2000 sends a GetServices command to the monitoring camera 1000. The monitoring camera 1000 receives the GetServices command and then sends a response to this command.

Reference numeral 6051 represents a GetServiceCapabilities transaction. Through this transaction, the client apparatus 2000 is able to acquire a list of functions of the individual Web services acquired in the transaction 6050.

The client apparatus 2000 sends a GetServiceCapabilities command to the monitoring camera 1000. The monitoring camera 1000 receives the GetServiceCapabilities command and then sends a response to this command.

Reference numeral 6052 represents a GetImagingSettings transaction. Through this transaction, the client apparatus 2000 is able to acquire a list of GetImagingSettings held by the monitoring camera 1000. The GetImagingSettings are stored in the storage unit 1002.

The client apparatus 2000 sends a GetImagingSettings command to the monitoring camera 1000. The monitoring camera 1000 receives the GetImagingSettings command and then sends a response to this command.

Reference numeral 6053 represents a GetOptions command transaction. Through this transaction, the client apparatus 2000 is able to acquire an option concerning a parameter for the ImagingSettings which is acceptable by the monitoring camera 1000.

The client apparatus 2000 sends a GetOptions command to the monitoring camera 1000. The monitoring camera 1000 receives the GetOptions command and then sends a response to this command.

Reference numeral 6054 represents a SetImagingSettings transaction. Through this transaction, the client apparatus 2000 sends a new ImagingSettings to the monitoring camera 1000, and is thereby able to change the details of ImagingSettings stored in the storage unit 1002.

Reference numeral 6055 represents an ImagingSetting change notification event. After the command processing of the transaction 6054, the monitoring camera 1000 sends the ImagingSetting change notification event to the client apparatus 2000, and thereby notifies the client apparatus 2000 of the occurrence of a change in the ImagingSettings.

FIGS. 6A, 6B, 6C, 6D, and 6E are diagrams for explaining examples of a definition of an ImagingSettings type according to the first embodiment. In the first embodiment, to define the ImagingSettings type, an XML Schema Definition language (hereafter, may be referred to as "XSD"), which is used for the ONVIF standard, is employed.

FIG. 6A illustrates the details of the ImagingSettings type. In FIG. 6A, a sequence specifier specifies that the elements of FIG. 6A appear in the defined order. For example, BacklightCompensation, which will be described later, appears before WideDynamicRange and DarkCompensation. WideDynamicRange appears before DarkCompensation.

In FIG. 6A, BacklightCompensation (hereinafter, may be referred to as BLC) represents a parameter for causing the backlight correction process of the exposure correction processing unit 1005 to be ON or OFF. The BLC is configured, by a minOccurs specifier of the XSD, to be able to be omitted.

Brightness represents a parameter for specifying the brightness of a captured image output from the imaging unit 1004. Brightness is configured, by a minOccurs specifier of the XSD, to be able to be omitted. ColorSaturation represents a parameter for specifying the saturation of a captured image output from the imaging unit 1004. ColorSaturation is configured, by a minOccurs specifier of the XSD, to be able to be omitted.

Contrast represents a parameter for specifying the density of color of a captured image output from the imaging unit 1004. Contrast is configured, by a minOccurs specifier of the XSD, to be able to be omitted. Exposure represents a parameter for changing the exposure of a captured image output from the imaging unit 1004. Exposure is configured, by a minOccurs specifier of the XSD, to be able to be omitted.

Focus represents a parameter for changing the focus setting of the imaging unit 1004. Focus is configured, by a minOccurs specifier of the XSD, to be able to be omitted. IrCutFilter represents a parameter for changing the setting of an infrared cut filter (IRCF), which can be inserted in and removed from an optical path of the imaging optical system included in the imaging unit 1004.

The IRCF is a filter for blocking an infrared ray. IrCutFilter is configured, by a minOccurs specifier of the XSD, to be able to be omitted.

Sharpness represents a parameter for changing the sharpness setting of a captured image output from the imaging unit 1004. Sharpness is configured, by a minOccurs specifier of the XSD, to be able to be omitted.

WideDynamicRange represents a parameter for changing the setting of a WDR process by the WDR image synthesis processing unit 1006. For a WideDynamicRange value, ON or OFF can be set. WideDynamicRange is configured, by a minOccurs specifier of the XSD, to be able to be omitted.

WideDynamicRange with the value set to ON indicates that the monitoring camera 1000 is caused to be ON for the WDR process. WideDynamicRange with the value set to OFF indicates that the monitoring camera 1000 is caused to be OFF for the WDR process. The SetImagingSettings command according to the first embodiment corresponds to a synthesis command for controlling the operation of the WDR image synthesis processing unit 1006.

WhiteBalance represents a parameter for adjusting the white balance of a captured image output from the imaging unit 1004. WhiteBalance is configured, by a minOccurs specifier of the XSD, to be able to be omitted. Extension includes an extended parameter which is developed as illustrated in FIG. 6B. Extension is configured, by a minOccurs specifier of the XSD, to be able to be omitted.

FIGS. 6B, 6C, 6D and 6E are parameters to be added to ImagingSettings illustrated in FIG. 6A. These parameters are part of image processing setting as with each parameter in FIG. 6A.

ImageStabilization in FIG. 6B represents a parameter for setting a vibration-proof function for a captured image output from the imaging unit 1004. In FIG. 6B, a sequence specifier specifies that the elements of FIG. 6B appear in the defined order.

IrCutFilterAutoAdjustment in FIG. 6C represents a parameter for setting information (luminance level of a subject or delay time) used in cases where an IRCF is inserted and removed. In FIG. 6C, a sequence specifier specifies that the elements of FIG. 6C appear in the defined order.

Each of ImageStabilization and IrCutFilterAutoAdjustment is configured, by a minOccurs specifier of the XSD, to be able to be omitted.

DarkCompensation in FIG. 6D represents a parameter for setting a dark part correction process by the exposure correction processing unit 1005 which detects a dark part of a captured image output from the imaging unit 1004 and brightens the detected dark part. In FIG. 6D, a sequence specifier specifies that the elements of FIG. 6D appear in the defined order.

Hereinafter, DarkCompensation may be referred to as DC. DarkCompensation is configured, by a minOccurs specifier of the XSD, to be able to be omitted.

For a DC value, ON, OFF or AUTO can be set. DC with the value set to ON indicates that the monitoring camera 1000 is caused to be ON for the dark part correction process. DC with the value set to OFF indicates that the monitoring camera 1000 is caused to be OFF for the dark part correction process. Further, DC with the value set to AUTO indicates that the monitoring camera 1000 is caused to automatically determine ON or OFF for the dark part correction process.

Thus, the SetImagingSettings command in the first embodiment corresponds to an exposure setting command for controlling the operation of the exposure correction processing unit 1005.

For a DC value, any one of ON, OFF and AUTO can be set. (That is, options for DC include ON, OFF, and AUTO.)

Therefore, in the GetOptions transaction 6053, the above mentioned option is returned to the client apparatus 2000, concerning WDR, BC, and DC, as a settable parameter.

In the SetImagingSettings transaction 6054, it is possible to add a Level parameter for specifying an effective intensity to WDR with the value of ON. Likewise, in this transaction, a Level parameter for specifying an effective intensity can be added to DC with the value of ON.

In the first embodiment, a Level parameter which corresponds to WDR with the value of ON corresponds to a level at which a captured image output from the imaging unit 1004 is brightened by the WDR image synthesis processing unit 1006. Further, it is assumed that the value of this level is limited within a specified range.

FIGS. 7A, 7B, 7C, and 7D illustrate command configuration examples of a SetImagingSettings transaction 6054. The command is described in an extensible markup language (XML).

FIG. 7A is a diagram illustrating an example of the configuration of the SetImagingSettings command. The command is provided for updating the above-mentioned setting parameters of BacklightCompensation (7001), WideDynamicRange (7002), and DarkCompensation (7003).

The client apparatus 2000 notifies the monitoring camera 1000 of the command in FIG. 7A, and the setting parameters stored in the monitoring camera 1000 are updated accordingly.

As illustrated in FIG. 7A, in the SetImagingSettings command, the setting parameter for the BacklightCompensation (7001) is described before the setting parameter for the WideDynamicRange (7002).

Further, in the SetImagingSettings command, the setting parameter for the WideDynamicRange (7002) is described before the setting parameter for the DarkCompensation (7003).

FIGS. 7B, 7C, and 7D illustrate individual setting parameters. FIG. 7B illustrates a configuration of a setting parameter for the BacklightCompensation (7001). The value of the Mode of the setting parameter is set to ON. When the value of the Mode is set to ON, the Level can be described for the setting parameter. The value of the Level of the setting parameter is set to 1.8.

The setting parameter for the BacklightCompensation (7001) according to the first embodiment indicates that backlight correction process is caused to be performed and corresponds to first image processing information which indicates the level at which a captured image output from the imaging unit 1004 is brightened by the backlight correction process.

As described above, the value of the Mode of the BacklightCompensation (7001) is not limited to ON. For this Mode, ON or OFF is set in an alternative manner.

When the value of the Mode is set to OFF, the Level cannot be described for the setting parameter. In the ONVIF, the value of the Level is a numerical value, and as for the unit of this value, it is defined as unit-less. Further, in the ONVIF, while the value range is limited within a specified range, the upper limit and the lower limit of the range are freely defined by individual monitoring camera manufacturers.

It is configured that the larger the Level value, the brighter the captured image output from the imaging unit 1004.

FIG. 7C is a diagram illustrating a configuration of a setting parameter for the WideDynamicRange. The value of the Mode of the setting parameter is set to ON. When the value of the Mode is set to ON, the Level can be described for the setting parameter.

The setting parameter for the WideDynamicRange (7002) in the first embodiment indicates that the WDR process is caused to be performed and corresponds to first image processing information which indicates the level at which a captured image output from the imaging unit 1004 is brightened by the WDR process. Further, as described above, the value of the Mode of the WideDynamicRange (7002) is not limited to ON. For this Mode, ON or OFF is set in an alternative manner.

When the value of the Mode is set to OFF, the Level cannot be described for the setting parameter. In the ONVIF, the value of the Level is a numerical value, and as for the unit of this value, it is defined as unit-less. Further, in the ONVIF, while the value range is limited within a specified range, the upper limit and the lower limit of the range are freely defined by individual monitoring camera manufacturers.

It is configured that the larger the Level value, the brighter the captured image output from the imaging unit 1004.

FIG. 7D is a diagram illustrating a configuration of a setting parameter for the DarkCompensation (7003). In FIG.

7D, parameter values corresponding to settings illustrated in FIG. 8, which will be described later, are exemplified. The value of the Mode of this setting parameter is set to AUTO.

As described above, the value of the Mode of the setting parameter for the DarkCompensation (7003) in the first embodiment is not limited to AUTO. For this Mode, ON, OFF, or AUTO is set in an alternative manner.

When the value of the Mode is set to ON, the Level can be described for the setting parameter. When the value of the Mode is set to OFF or AUTO, the Level cannot be described for the setting parameter.

In the ONVIF, the value of the Level is a numerical value, and as for the unit of this value, it is defined as unit-less. Further, in the ONVIF, the value range is limited within a specified range. Specifically, the value range is defined between 0 and +1.0. It is configured that the larger the Level value, the brighter the captured image output from the imaging unit 1004.

The SetImagingSettings command in the first embodiment corresponds to a single command in which the first image processing information concerning the operation of the exposure correction processing unit 1005 and the second image processing information concerning the operation of the WDR image synthesis processing unit 1006 can be described.

Figure 8:
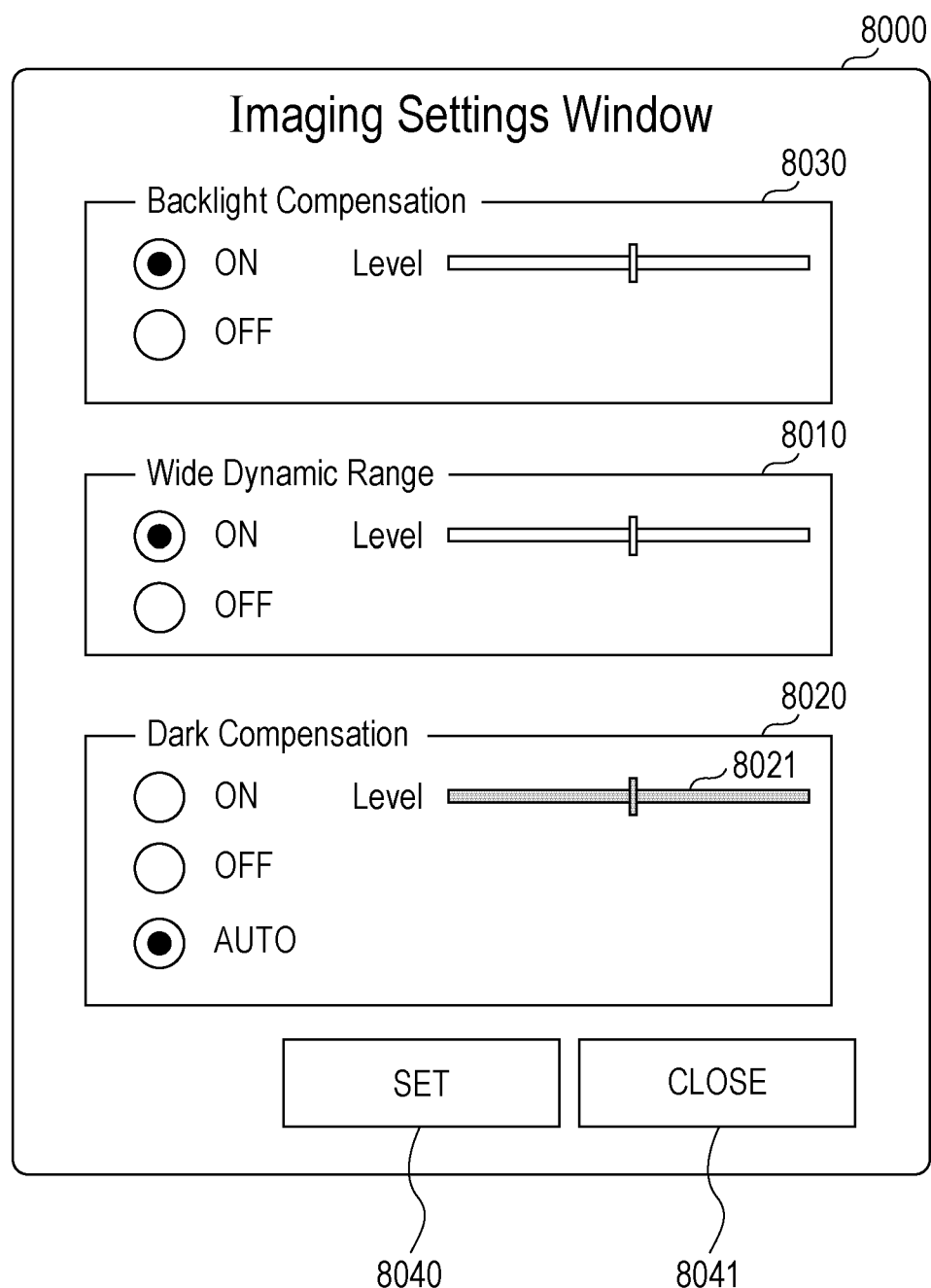
FIG. 8 is a diagram illustrating an example of an ImagingSettings window according to the first embodiment of the present invention.

FIG. 8 is a diagram for explaining an example of an ImagingSettings window for setting ImagingSettings of the monitoring camera 1000. The window is displayed on the display unit 2006 under the control of the control unit 2001.

In FIG. 8, an ImagingSettings window 8000 includes a WideDynamicRange setting parameter input area 8010 and a DarkCompensation setting parameter input area 8020. The ImagingSettings window 8000 also includes a BacklightCompensation setting parameter input area 8030, a set button 8040, and a close button 8041.

On the window in FIG. 8, the BacklightCompensation setting parameter input area 8030 is displayed upper than the WideDynamicRange setting parameter input area 8010. Further, on the window in FIG. 8, the WideDynamicRange setting parameter input area 8010 is displayed upper than the DarkCompensation setting parameter input area 8020.

The WideDynamicRange setting parameter input area 8010 includes radio buttons of two options ON and OFF. In the first embodiment, the option ON corresponds to a synthesis operation option which indicates that the WDR image synthesis processing unit 1006 is caused to perform an operation, and the option OFF corresponds to a synthesis stop option which indicates that the WDR image synthesis processing unit 1006 is caused to be stopped.

Therefore, in the first embodiment, the WideDynamicRange setting parameter input area 8010 corresponds to a first image processing information input area for allowing a user to input the first image processing information concerning the operation of the WDR image synthesis processing unit 1006.

The DarkCompensation setting parameter input area 8020 includes radio buttons of three options ON, OFF, and AUTO. In the first embodiment, the option ON corresponds to an image processing operation option which indicates that the dark park correction process is caused to be performed, and the option OFF corresponds to an image processing stop option which indicates that the dark park correction process is caused to be stopped.

The option corresponding to AUTO corresponds to an image processing automatic option for causing the monitoring camera 1000 to automatically control the operation of the exposure correction processing unit 1005. Therefore, in the first embodiment, the DarkCompensation setting parameter input area 8020 corresponds to a second image processing information input area for allowing the user to input the second image processing information concerning the operation of the exposure correction processing unit 1005.

When the set button 8040 is depressed by the user, the client apparatus 2000 sends to the monitoring camera 1000 a SetImagingSettings command 7000 based on the details set on the ImagingSettings window 8000. Along with the command transmission, the client apparatus 2000 ends the display of the ImagingSettings window 8000.

The ImagingSettings window 8000 in the first embodiment corresponds to a user interface for allowing the user to input values for BLC, WDR, and DC, which are included in the SetImagingSettings command.

When the close button 8041 is depressed by the user, the client apparatus 2000 ends the display of the ImagingSettings window 8000, without sending the SetImagingSettings command to the monitoring camera 1000.

In the example of FIG. 8, DarkCompensation is set to AUTO, and a bar 8021 for setting the Level is accordingly grayed out.

In the ImagingSettings window 8000 in FIG. 8, all of the BacklightCompensation (7001), the WideDynamicRange (7002), and the DarkCompensation (7003) can be enabled.

Therefore, the backlight correction process, the WDR process, and the dark part correction process may be performed simultaneously, which may cause a captured image output from the imaging unit 1004 to become too bright. In the first embodiment, the value of the DarkCompensation (7003) can be set to AUTO, and therefore, the monitoring camera 1000 is able to perform an appropriate dark part correction process while taking individual processes into account.

Figure 9:
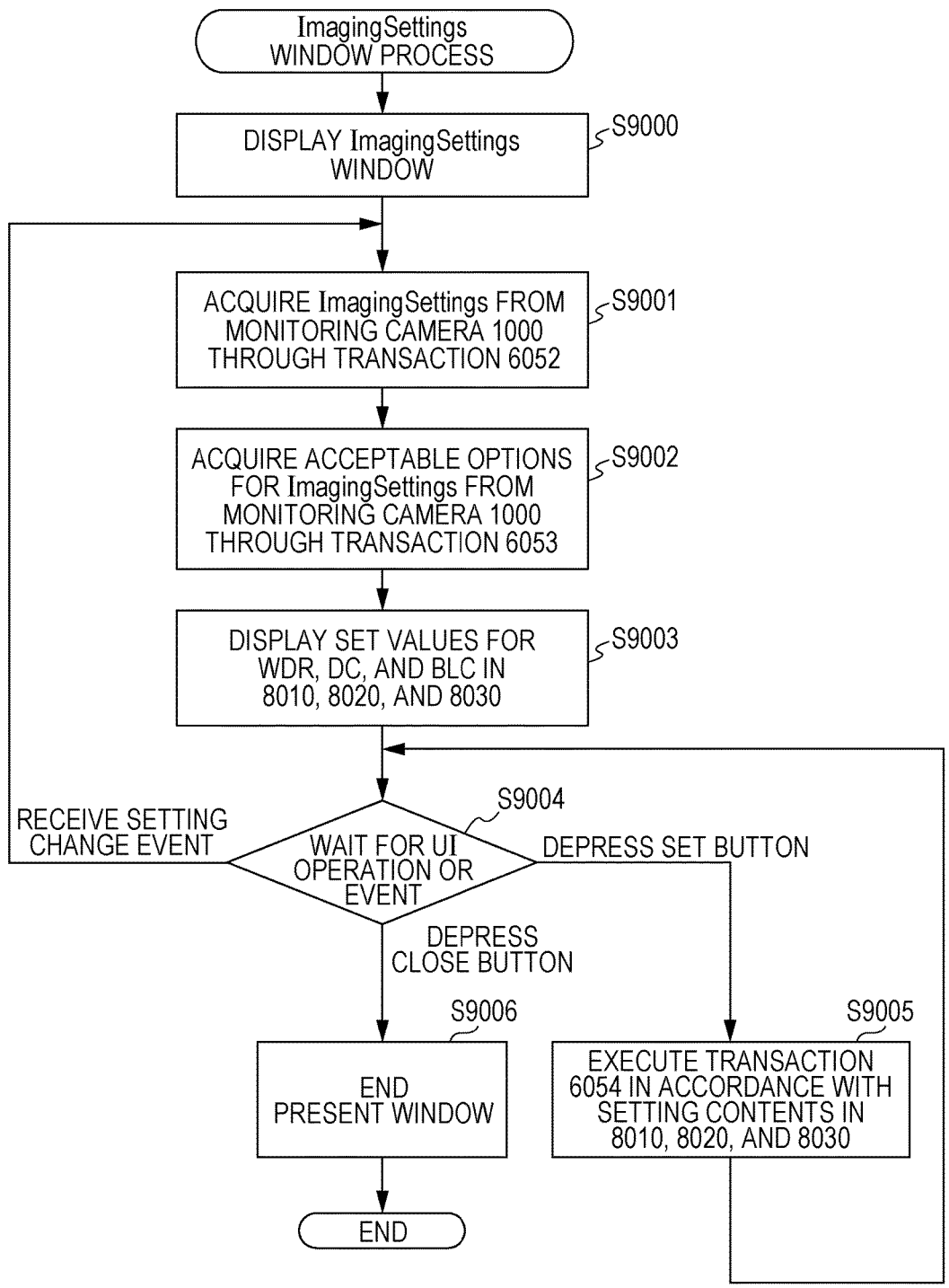
FIG. 9 is a flowchart for explaining a process for displaying the ImagingSettings window according to the first embodiment of the present invention.

FIG. 9 is a flowchart for explaining a process for displaying the ImagingSettings window of the client apparatus 2000 according to the first embodiment. The process is executed at the client apparatus 2000 when a user of the client apparatus 2000 changes image processing setting for a captured image which is to be distributed through streaming by the monitoring camera 1000.

This process is performed by the control unit 2001. As a result of the process, the window illustrated in FIG. 8 is displayed on the display unit 2006 of the client apparatus 2000.

In the window of ImagingSettings in FIG. 8, only the values of WDR, DC, and BC are displayed to be settable. However, settable values are not limited to them. For example, in FIG. 8, values of other parameters included in FIG. 6A to 6E (or all parameters) may be displayed to be settable.

In step S9000 in FIG. 9, the control unit 2001 issues an instruction to the display unit 2006 to display the ImagingSettings window illustrated in FIG. 8.

In step S9001, the control unit 2001 executes the transaction 6052, and thereby acquires a list of ImagingSettings from the monitoring camera 1000. Then, the control unit 2001 causes the storage unit 1002 to store the acquired list of ImagingSettings.

Normally, the number of ImagingSettings included in the acquired list is equal to the number of imaging units provided in the monitoring camera. The monitoring camera 1000 in the first embodiment includes one imaging unit 1004. Accordingly, the number of ImagingSettings included in the list acquired in step S9001 is one. However, the number of ImagingSettings is not limited to this.

For example, it can be assumed that multiple imaging units are provided in the monitoring camera and multiple ImagingSettings are therefore included in the list acquired in step S9001. Based on such an assumption, multiple tabs may be provided within the window in FIG. 8, for switching between multiple ImagingSettings displays.

Alternatively, the window illustrated in FIG. 8 may be displayed for individual ImagingSettings. For example, in the case where two ImagingSettings are included in the list acquired in step S9001, two windows in FIG. 8 may be displayed for the two ImagingSettings.

In step S9002, the control unit 2001 executes the transaction 6053, and thereby acquires from the monitoring camera 1000 options and the like for individual parameters of ImagingSettings that are acceptable by the monitoring camera 1000. Then, the control unit 2001 causes the storage unit 1002 to store information including the acquired options and the like.

In step S9003, the control unit 2001 causes the display unit 2006 to display the window in FIG. 8. The control unit 2001 causes the radio buttons, which correspond to set values on the window in FIG. 8, to be selected, in accordance with the set values of WDR, DC, and BLC included in ImagingSettings acquired in step S9001.

For example, the control unit 2001 reads the value of the BacklightCompensation setting parameter in the ImagingSettings stored in the storage unit 2002. Then, the control unit 2001 determines whether the read value is ON or OFF.

When the control unit 2001 determines that the read value is ON, the control unit 2001 causes the option corresponding to ON of the radio button, which is included in the BacklightCompensation setting parameter input area 8030, to be selected.

When the control unit 2001 determines that the read value is OFF, the control unit 2001 causes the option corresponding to OFF of the radio button, which is included in the BacklightCompensation setting parameter input area 8030, to be selected.

Further, the control unit 2001 reads, for example, the value of the WideDynamicRange setting parameter in the ImagingSettings stored in the storage unit 2002. Then, the control unit 2001 determines whether the read value is ON or OFF.

When the control unit 2001 determines that the read value is ON, the control unit 2001 causes the option corresponding to ON of the radio button, which is included in the WideDynamicRange setting parameter input area 8010, to be selected.

When the control unit 2001 determines that the read value is OFF, the control unit 2001 causes the option corresponding to OFF of the radio button, which is included in the WideDynamicRange setting parameter input area 8010, to be selected.

Further, the control unit 2001 reads, for example, the value of the DarkCompensation setting parameter in the ImagingSettings stored in the storage unit 2002. Then, the control unit 2001 determines whether the read value is ON, OFF, or AUTO.

When the control unit 2001 determines that the read value is ON, the control unit 2001 causes the option corresponding to ON of the radio button, which is included in the DarkCompensation setting parameter input area 8020, to be selected.

When the control unit 2001 determines that the read value is OFF, the control unit 2001 causes the option corresponding to OFF of the radio button, which is included in the DarkCompensation setting parameter input area 8020, to be selected.

When the control unit 2001 determines that the read value is AUTO, the control unit 2001 causes the option corresponding to AUTO of the radio button, which is included in the DarkCompensation setting parameter input area 8020, to be selected.

Furthermore, the control unit 2001 causes, based on the details of the options acquired in step S9002, radio buttons other than the radio buttons acceptable by the monitoring camera 1000, among the options in the window of FIG. 8, to be displayed such that they cannot be selected by the user.

After causing the radio buttons of the WideDynamicRange setting parameter input area 8010 to be displayed in such a manner that a parameter can be input, the control unit 2001 may cause the radio buttons of the DarkCompensation setting parameter input area 8020 to be displayed in such a manner that a parameter can be input.

In step S9004, the control unit 2001 waits until any of the buttons on the window in FIG. 8 is depressed or until the ImagingSettings setting change event 6055 is received from the monitoring camera 1000.

Then, when it is determined that the set button 8040 is depressed, the control unit 2001 proceeds to step S9005. When it is determined that the close button 8041 is depressed, the control unit 2001 proceeds to step S9006. Then, when the ImagingSettings setting change event 6055 is received by the communication unit 2003, the control unit 2001 returns to step S9001.

In step S9005, the control unit 2001 generates the SetImagingSettings command 7000, which includes parameters corresponding to the radio buttons selected in the input areas 8010, 8020, and 8030. Then, the control unit 2001 instructs the communication unit 2003 to transmit the generated SetImagingSettings command to the monitoring camera 1000.

That is, in the generated SetImagingSettings command, a value corresponding to the option selected through the radio button for the WideDynamicRange setting parameter input area 8010 or the like is described. Similarly, in the generated SetImagingSettings command, a value corresponding to the option selected through the radio button for the DarkCompensation setting parameter input area 8020 or the like is described.

In addition, similarly, in the generated SetImagingSettings command, a value corresponding to the option selected through the radio button for the BacklightCompensation setting parameter input area 8030 or the like is described.

Specifically, when the set button 8040 is depressed for the setting contents on the window in FIG. 8, the client apparatus 2000 sends the SetImagingSettings command illustrated in FIG. 7 to the monitoring camera 1000.

In step S9006, the control unit 2001 ends the display of the window in FIG. 8 on the display unit 2006.

As described above, in the first embodiment, in the SetImagingSettings command received by the monitoring camera 1000, the WDR setting parameter and the DC setting parameter may be described.

The WDR setting parameter indicates, in an alternative manner, that the WDR process is caused to be operated or that the WDR process is caused to be stopped. Meanwhile, the DC setting parameter indicates, in an alternative manner, that the dark part correction process by the exposure correction processing unit 1005 is caused to be operated, that the dark part correction process is caused to be stopped, or that the performance of the dark part correction process is caused to be controlled by the monitoring camera 1000.

Accordingly, in the case where the WDR process is caused to be operated, the monitoring camera 1000 can be caused to automatically control whether the dark part correction process is to be operated. Therefore, with a consideration of the degree at which a captured image is brightened by each of the WDR process and the dark part correction process, the necessity of controlling the performances of the WDR process and the dark part correction process can be reduced.

Further, the SetImagingSettings command and the WDR setting parameter in the SetImagingSettings command in the first embodiment are standardized among plural monitoring camera manufacturers.

For example, the ONVIF standardizes the SetImagingSettings command as a single command for setting imaging processing and image processing by a monitoring camera. Further, the ONVIF standardizes the WDR setting parameter in this command as a value of either ON or OFF.

In the case where the DC setting parameter is newly added to such a SetImagingSettings command, it is very effective to set a value of either ON, OFF, or AUTO as the DC setting parameter.

This is because effects of the WDR process and the dark part correction process vary depending on the monitoring camera manufacturer and it is very difficult to control the performances of the WDR process and the dark part correction process in such a manner that a captured image output from the imaging unit 1004 is neither too dark nor too bright.

Accordingly, by newly providing AUTO as a value to be set for the DC setting parameter, as in this embodiment, the performance of the dark part correction process is able to be automatically controlled by the monitoring camera 1000. Consequently, a situation can be prevented in which a captured image output from the imaging unit 1004 is too dark or too bright.

Furthermore, the above-mentioned processing is particularly effective for a monitoring camera which monitors a predetermined monitoring region. Specifically, a captured image of a monitoring region is important information as an evidence in case of an emergency. Therefore, it is not allowed to inappropriately set the performances of the WDR process and the dark part correction process by a monitoring camera and to cause halation and black fullness in the captured image of the monitoring region.

Effects of the first embodiment have been described above based on the relationship between the WDR process and the dark part correction process. The effects of the first embodiment are, however, also similar in the case of the relationship between the backlight correction process and the dark part correction process and the relationship among the backlight correction process, the WDR correction process, and the dark part correction process.

Furthermore, in the SetImagingSettings command in the first embodiment, the setting parameter for the DarkCompensation (7003) is described after the setting parameter for the WideDynamicRange (7002).

Accordingly, in accordance with the result of the setting of the setting parameter for the WideDynamicRange (7002), the setting parameter for the DarkCompensation (7003) is able to be set. For example, in accordance with the setting of the value of the Mode of the setting parameter for the WideDynamicRange (7002) to ON, the value of the Mode of the setting parameter for the DarkCompensation (7003) is able to be set to AUTO.

As a result, after confirming the setting parameter for the WideDynamicRange (7002), the setting parameter for the DarkCompensation (7003) is able to be set. Thus, smooth parameter setting can be attained.

This point applies to the relationship between the setting parameter for the BacklightCompensation (7001) and the setting parameter for the DarkCompensation (7003).

Furthermore, the monitoring camera 1000 may convert the setting parameter for the DarkCompensation (7003) in accordance with the result of the setting of the setting parameter for the WideDynamicRange (7002) described in the SetImagingSettings command. For example, the monitoring camera 1000 may increase or decrease the correction intensity of the setting parameter for the DarkCompensation (7003) in accordance with the correction intensity of the setting parameter for the WideDynamicRange (7002).

Furthermore, the monitoring camera 1000 may control the dark part correction process in accordance with a correction result of the WDR process. For example, the monitoring camera 1000 may increase or decrease the correction intensity of the dark part correction process in accordance with the amount of change in the brightness of a captured image by the WDR process. Furthermore, in the case where the performance of the dark part correction process is automatically controlled by the monitoring camera 1000, the correction process may be operated or stopped in accordance with the amount of change in the brightness of a captured image by the WDR process.

Furthermore, although the set values for the BC, the WDR, and the DC are transmitted in the first embodiment, the transmission may be omitted. Moreover, although the Level is set for the BC and the WDR in the first embodiment, the settings may be omitted.

Although a parameter for setting the dark part correction process by the exposure correction processing unit 1005 is called "DarkCompensation" in the first embodiment, the parameter is not necessarily called this. The parameter may be called "DarknessCompensation", instead of "DarkCompensation". Alternatively, the parameter may be called "Delighting", instead of "DarkCompensation".

In addition, the exposure correction processing unit 1005 in the first embodiment may be formed of plural processing blocks. In such a case, a processing block for performing the backlight correction process and a processing block for performing the dark part correction process are not necessarily the same. For example, among two processing blocks included in the exposure correction processing unit 1005, one may be used as a processing block for performing the backlight correction process and the other may be used as a processing block for performing the dark part correction process.

In this case, the processing block for performing the backlight correction process corresponds to the first image processing unit which brightens a captured image by image processing, and the processing block for performing the dark part correction process corresponds to the second image processing unit which brightens a captured image by image processing that is different from the image processing performed by the first image processing unit.

In step S9004 in the first embodiment, the control unit 2001 may determine whether or not the option corresponding to the radio button ON of the WideDynamicRange setting parameter input area 8010 has been selected.

Furthermore, when it is determined that the option corresponding to ON has been selected, the control unit 2001 may cause the option corresponding to the radio button AUTO of the DarkCompensation setting parameter input area 8020 to be selected.

Then, the control unit 2001 may determine whether or not the option corresponding to the radio button OFF of the WideDynamicRange setting parameter input area 8010 has been selected.

When it is determined that the option corresponding to OFF has been selected, the control unit 2001 may cause the option corresponding to the radio button ON of the Dark-Compensation setting parameter input area 8020 to be selected.

In step S9004 in the first embodiment, the control unit 2001 may determine whether or not the option corresponding to the radio button ON of the BacklightCompensation setting parameter input area 8030 has been selected.

Furthermore, when it is determined that the option corresponding to ON has been selected, the control unit 2001 may cause the option corresponding to the radio button AUTO of the DarkCompensation setting parameter input area 8020 to be selected.

Then, the control unit 2001 may determine whether or not the option corresponding to the radio button OFF of the BacklightCompensation setting parameter input area 8030 has been selected.

When it is determined that the option corresponding to OFF has been selected, the control unit 2001 may cause the option corresponding to the radio button ON of the Dark-Compensation setting parameter input area 8020 to be selected.

Furthermore, in step S9004 in the first embodiment, first, the control unit 2001 may display, on the display unit 2006, only the BacklightCompensation setting parameter input area 8030. After displaying the BacklightCompensation setting parameter input area 8030, when it is determined that a parameter has been input to the BacklightCompensation setting parameter input area 8030, the control unit 2001 may display, on the display unit 2006, the WideDynamicRange setting parameter input area 8010.

After displaying the WideDynamicRange setting parameter input area 8010, the control unit 2001 may display, on the display unit 2006, the DarkCompensation setting parameter input area 8020.

Accordingly, after the BacklightCompensation setting parameter input area 8030 is displayed, the WideDynamicRange setting parameter input area 8010 is displayed on the display unit 2006. Further, after the WideDynamicRange setting parameter input area 8010 is displayed, the Dark-Compensation setting parameter input area 8020 is displayed on the display unit 2006.

Furthermore, in step S9004 in the first embodiment, first, the control unit 2001 may display, on the display unit 2006, only the BacklightCompensation setting parameter input area 8030. Further, after displaying the BacklightCompensation setting parameter input area 8030, the control unit 2001 may determine whether or not a parameter has been input to the BacklightCompensation setting parameter input area 8030.

When it is determined that a parameter has been input to the BacklightCompensation setting parameter input area 8030, the control unit 2001 may display the WideDynamicRange setting parameter input area 8010, on the display unit 2006, in such a manner that a parameter can be input to the WideDynamicRange setting parameter input area 8010. After displaying the WideDynamicRange setting parameter input area 8010, the control unit 2001 may determine whether or not a parameter has been input to the WideDynamicRange setting parameter input area 8010.

When it is determined that a parameter has been input to the WideDynamicRange setting parameter input area 8010, the control unit 2001 may display the DarkCompensation setting parameter input area 8020, on the display unit 2006, in such a manner that a parameter can be input to the DarkCompensation setting parameter input area 8020.

Accordingly, after the BacklightCompensation setting parameter input area 8030 is displayed on the display unit 2006 in such a manner that a parameter can be input to the BacklightCompensation setting parameter input area 8030, the WideDynamicRange setting parameter input area 8010 is displayed on the display unit 2006 in such a manner that a parameter can be input to the WideDynamicRange setting parameter input area 8010. Further, after the WideDynamicRange setting parameter input area 8010 is displayed on the display unit 2006 in such a manner that a parameter can be input to the WideDynamicRange setting parameter input area 8010, the DarkCompensation setting parameter input area 8020 is displayed on the display unit 2006 in such a manner that a parameter can be input to the DarkCompensation setting parameter input area 8020.

Furthermore, although a single captured image output from the imaging unit 1004 is used and the backlight correction process and the dark part correction process are performed as processes for brightening the captured image in the first embodiment, the present invention is not limited to this. For example, instead of any of the backlight correction process and the dark part correction process, a pixel addition process for brightening a single captured image output from the imaging unit 1004, by adding pixels around a target pixel of the captured image.

In the first embodiment, the range of the value of the Level of the setting parameter for the BacklightCompensation (7001) may be wider than the range of the value of the Level of the setting parameter for the DarkCompensation (7003).

Similarly, the range of the value of the Level of the setting parameter for the WideDynamicRange (7002) may be wider than the range of the value of the Level of the setting parameter for the DarkCompensation (7003).

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An imaging apparatus which communicates with an external apparatus via a network, the imaging apparatus comprising:
   a hardware processor; and
   a memory for storing instructions to be executed by the hardware processor,
   wherein, when the instructions stored in the memory are executed by the hardware processor, the imaging apparatus functions as:
   an imaging unit;
   a first image processing unit configured to change, by image processing, a brightness of a captured image output from the imaging unit;
   a second image processing unit configured to change, by image processing that is different from the image processing by the first image processing unit, a brightness of a captured image output from the imaging unit;
   a receiving unit configured to receive, from the external apparatus via the network, a command in which first image processing information for controlling an operation of the first image processing or second image processing information for controlling an operation of the second image processing; and
   a control unit configured to control the first image processing and the second image processing in accordance with the command received by the receiving unit,
   wherein the first image processing information includes information indicating whether the first image processing is caused to be executed or not, and
   wherein the second image processing information includes at least any one of information indicating that the second image processing is caused to be executed, information indicating that the second image processing is not to be executed, and information indicating that the operation of the second image processing is caused to be automatically controlled by the imaging apparatus.

2. The imaging apparatus according to claim 1,
   wherein the first image processing unit changes the brightness of the captured image output from the imaging unit, by synthesizing plural captured images output from the imaging unit, and
   wherein the second image processing unit changes, by the image processing, the brightness of a single captured image output from the imaging unit.

3. The imaging apparatus according to claim 1, wherein the second image processing information described after the first image processing information in the command.

4. The imaging apparatus according to claim 1,
   wherein the first image processing information indicates, in an alternative manner, that the first image processing is caused to be executed or that the first image processing is caused not to be executed, and
   wherein the second image processing information indicates, in an alternative manner, that the second image processing is caused to be executed, that the second image processing is caused not to be executed, or that whether the second image processing is caused to be executed or not is automatically determined by the imaging apparatus.

5. The imaging apparatus according to claim 1, further comprising:
   a converting unit configured to perform conversion of the second image processing information for controlling the operation of the second image processing, in accordance with the first image processing information included in the command received by the receiving unit.

6. The imaging apparatus according to claim 1, wherein the control unit includes control for switching a correction intensity of the second image processing, in accordance with the brightness of the captured image changed by the first image processing.

7. The imaging apparatus according to claim 1, wherein the control unit includes control for automatically controlling whether the second image processing to be controlled by the imaging apparatus is caused to be executed or not, in accordance with the brightness of the captured image changed by the first image processing.

8. The imaging apparatus according to claim 1, wherein the first image processing information indicates that the first image processing is caused to be executed and indicates a level at which the brightness of the captured image output from the imaging unit is changed by the first image processing.

9. The imaging apparatus according to claim 8, wherein the level is limited within a specified range.

10. An image processing control apparatus configured to communicate, via a network, with an imaging apparatus including an imaging unit, a first image processing unit configured to change, by first image processing, a brightness of a captured image output from the imaging unit, and a second image processing unit configured to change, by second image processing that is different from the first image processing by the first image processing unit, a brightness of a captured image output from the imaging unit, the image processing control apparatus comprising:
    a transmitting unit configured to transmit a command including first image processing information for controlling an operation of the first image processing or second image processing information for controlling an operation of the second image processing,
    wherein the first image processing information includes information indicating whether the first image processing is caused to be executed or not, and
    wherein the second image processing information includes at least any one of information indicating that the second image processing is caused to be executed, information indicating that the second image processing is caused not to be executed, and information indicating that whether the second image processing is caused to be executed or not is automatically determined by the imaging apparatus.

11. The image processing control apparatus according to claim 10, further comprising:
    a user interface unit configured to allow a user to input the first image processing information and the second image processing information,
    wherein the command includes synthesis information and image processing information which are input by the user interface unit.

12. The image processing control apparatus according to claim 11, wherein the user interface unit allows the first image processing information to be input before the second image processing information.

13. The image processing control apparatus according to claim 12, wherein the user interface unit displays, on a display unit, a first image processing information input area where the first image processing information is to be input and a second image processing information input area where the second image processing information is to be input.

14. The image processing control apparatus according to claim 13, wherein the user interface unit displays the second image processing information input area after displaying the first image processing information input area.

15. The image processing control apparatus according to claim 13, wherein the user interface unit displays the second image processing information input area in such a manner that input is able to be performed, after displaying the first image processing information input area in such a manner that input is able to be performed.

16. The image processing control apparatus according to claim 13, wherein the user interface unit displays, on the display unit, the first image processing information input area above the second image processing information input area.

17. The image processing control apparatus according to claim 13,
 wherein the first image processing information input area includes a first image processing operation option indicating that the first image processing is caused to be executed or not,
 wherein the second image processing information input area includes a second image processing operation option indicating that the second image processing is caused to be executed or not, and an image processing automatic option indicating that whether the second image processing is caused to be executed or not is automatically determined by the imaging apparatus, and
 wherein when the first image processing operation option is selected by the user, the user interface unit causes the image processing automatic option to be selected.

18. A control method for an imaging apparatus which includes an imaging unit, a first image processing unit configured to change, by first image processing, a brightness of a captured image output from the imaging unit, and a second image processing unit configured to change, by second image processing that is different from the first image processing by the first image processing unit, a brightness of a captured image output from the imaging unit, and which communicates with an external apparatus via a network, the control method comprising:

a receiving step of receiving, from the external apparatus via the network, a command including first image processing information for controlling an operation of the first image processing and second image processing information for controlling an operation of the second image processing; and
 a control step of controlling the first image processing and the second image processing in accordance with the command received in the receiving step,
 wherein the first image processing information includes information indicating whether the first image processing is caused to be executed or not, and
 wherein the second image processing information includes at least any one of information indicating that the second image processing is caused to be executed, information indicating that the second image processing is caused not to be executed, and information indicating that whether the second image processing is caused to be executed or not is automatically determined by the imaging apparatus.

19. A control method for an image processing control apparatus which communicates, via a network, with an imaging apparatus including an imaging unit, a first image processing unit configured to change, by first image processing, a brightness of a captured image output from the imaging unit, and a second image processing unit configured to change, by second image processing that is different from the first image processing by the first image processing unit, a brightness of a captured image output from the imaging unit, the control method comprising:

a transmitting step of transmitting a command including first image processing information for controlling an operation of the first image processing and second image processing information for controlling an operation of the second image processing,
 wherein the first image processing information includes at least any one of information indicating whether the first image processing is caused to be executed or not, and
 wherein the second image processing information includes information indicating that the second image processing is caused to be executed, information indicating that the second image processing is caused not to be executed, and information indicating that whether the second image processing is caused to be executed or not is automatically determined by the imaging apparatus.

* * * * *